Feb. 17, 1942.                J. C. MAIRE                2,273,582
                          FISHHOOK STRUCTURE
                         Filed March 20, 1939
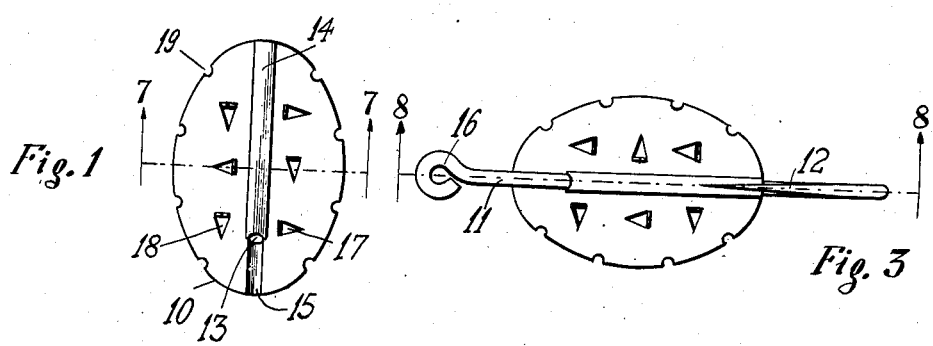
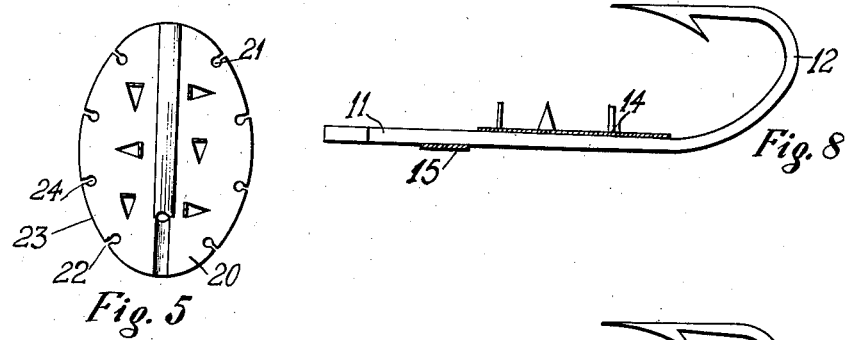
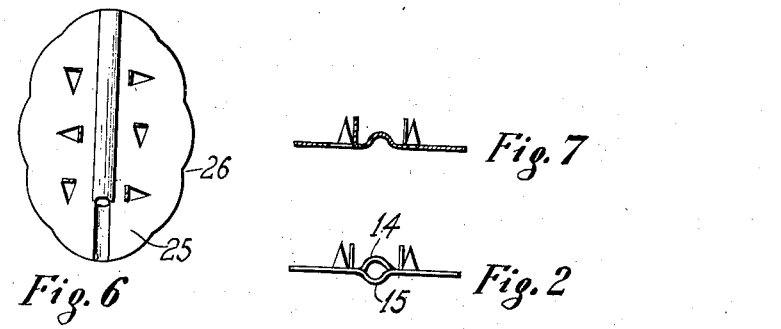
INVENTOR
Joseph C. Maire
BY
ATTORNEY Patented Feb. 17, 1942

2,273,582

UNITED STATES PATENT OFFICE 2,273,582

FISHHOOK STRUCTURE

Joseph Cline Maire, Bradley Beach, N. J.

Application March 20, 1939, Serial No. 262,854

4 Claims. (Cl. 43—40)

This invention relates to fishing equipment, and more particularly refers to improvements in fish hooks of the type in which means are provided for firmly securing all kinds of bait.

The primary object of this invention is to provide, in a fish hook, means of a novel and improved construction, whereby bait, such as live crabs or frogs or minnows, can be firmly secured on the hook in a manner making it impossible for the bait to be detached by a fish.

Another object is to provide a fish hook assembly of a novel and improved construction, having means whereby any kind of live bait may be firmly secured on the hook in a natural position, effectively luring the fish to bite.

A further object is to provide a novel and improved fish hook structure, including means adapted to engage any kind of bait, and to firmly secure it in position.

Other objects and advantages of the present invention will more fully appear as the description proceeds, and will be set forth and claimed in the appended claims.

My invention is illustrated by way of example in the accompanying drawing, in which:

Fig. 1 is a plan view of a plate adapted to be secured to a fish hook of conventional design, in order to transform it into a fish hook structure embodying my invention;

Fig. 2 is an end view of the same;

Fig. 3 is a plan view of a fish hook equipped with a plate of the type shown in Figs. 1 and 2;

Fig. 4 is a side view in elevation of the structure shown in Fig. 3;

Fig. 5 is a plan view of a plate of modified construction;

Fig. 6 is a plan view of a plate illustrating another alternative construction;

Fig. 7 is a cross sectional view through line 7—7 of Fig. 1; and

Fig. 8 is a longitudinal section through line 8—8 of Fig. 3.

My invention consists, essentially, in a fish hook of usual construction, equipped with a plate secured to the shank of the hook, said plate being formed with inwardly extending bait engaging prongs, and having notches or indentations or other irregularities along its edge, adapted to form anchorage points for a string or wire by means of which the bait may be secured in position against the plate.

Referring to Figs. 1 to 4, 7 and 8 of the drawing, 10 designates a plate, preferably made of sheet metal, adapted to be secured to the shank 11 of a fish hook 12. The plate is shown in the form of an oval, but can, of course, be made with a different outline if desired.

The plate is formed with a small transversal slit or perforation 13 at a point along its central longitudinal line, said slit or perforation dividing the central longitudinal portion of the plate into two sections. One of said sections is embossed to form a recessed, inwardly directed longitudinal rib portion 14, and the other section is embossed in the opposite direction, to form a recessed, outwardly directed longitudinal rib portion 15, in line with said portion 14. Said two rib portions have a substantially semi-circular section, together forming a longitudinal passage adapted to receive and embrace the shank of the hook, as Fig. 3 clearly shows. The shank can be inserted through said passage before its attaching end is formed into an eye such as 16, and the two parts are then firmly secured to each other by soldering or brazing, or welding, or in any other suitable manner.

The plate is formed with a plurality of inwardly extending pointed prongs 17, 18, offset from the body thereof, some of said prongs being transversely directed, and some being longitudinally directed.

In addition, the edge of the plate is indented by a peripheral series of notches 19, which will effectively prevent a string or wire used to tie the bait against the plate, from slipping.

The completed structure, shown in Figs. 3, 4 and 8, is, therefore, in the form of a fish hook equipped with a plate attached to its shank, said plate facing the bent end of the hook, and having bait engaging prongs inwardly extending from the plate, substantially at right angles to the body thereof.

The means for preventing slippage of a string or wire used to fasten the bait in position, may be different from those shown in Figs. 1 and 3. For instance, the plate 20 shown in Fig. 5, is provided with a peripheral series of perforations 21, having a keyhole outline, with their narrow extension 22 opening on the edge 23 of the plate, to provide passages for the string or wire to be introduced in the enlarged portion 24 of said perforations.

In the plate 25, shown in Fig. 6, the anchorage points 26 along the edge of the plate, are obtained by making the plate with a scalloped outline, as shown.

Other constructional details of my invention may vary from those shown, without departing from the inventive idea; the drawing should, therefore, be considered as being intended for illustrative purposes only and not in a limiting sense.

I, accordingly, reserve the right to carry my invention into practice in all those ways and manners which may enter, fairly, into the scope of the appended claims.

I claim:

1. The combination, with a fish hook, of a bait retaining plate secured to said hook, said plate having a plurality of indentations along its edge, serving as anchorage points preventing slipping of a flexible element used to fasten bait against said plate.

2. A fish hook comprising a shank portion and a hook portion extending therefrom, and a bait retaining plate secured to said shank portion, said plate being formed with prongs inwardly extending from said plate, substantially at right angles to the body thereof, and having indentations along its edge, serving as anchorage points to prevent slipping of a flexible element used to fasten bait against said plate.

3. The combination, with a fish hook comprising a shank portion and a hook portion extending therefrom, of a bait retaining plate adapted to be secured to said hook, said plate having a longitudinal passage adapted to receive said shank portion, said passage consisting of a recessed rib portion directed inwardly of said plate, and a recessed rib portion aligned therewith, directed outwardly of said plate, the shank portion of said hook extending beyond said plate, said plate having inwardly extending prongs directed substantially at right angles to the body thereof.

4. The combination, with a fish hook having a shank portion and a hook portion integral therewith extending therefrom, of a bait retaining plate secured to said shank portion in a fixed relation thereto, said plate facing said hook portion and having bait engaging prongs inwardly extending from the body thereof, said prongs being directed substantially at right angles to the surface of said plate.

JOSEPH CLINE MAIRE.